(No Model.)
J. M. SCOBEE.
VARIABLE SPEED GEARING FOR BICYCLES.
No. 538,287. Patented Apr. 30, 1895.
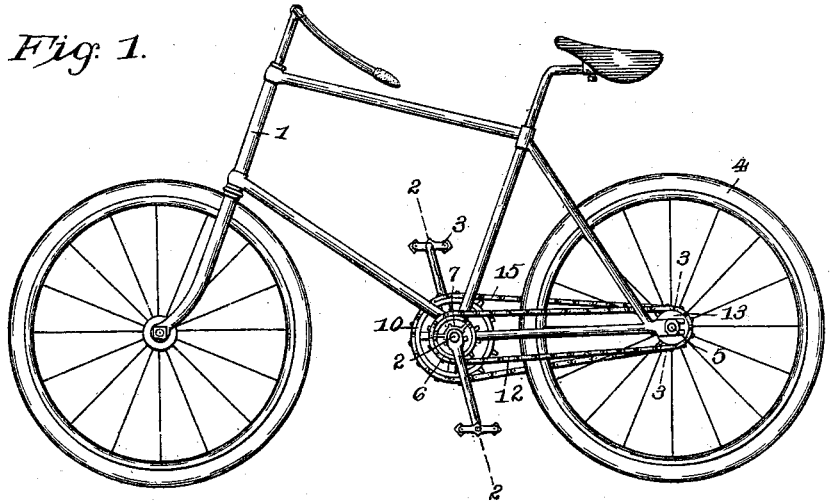
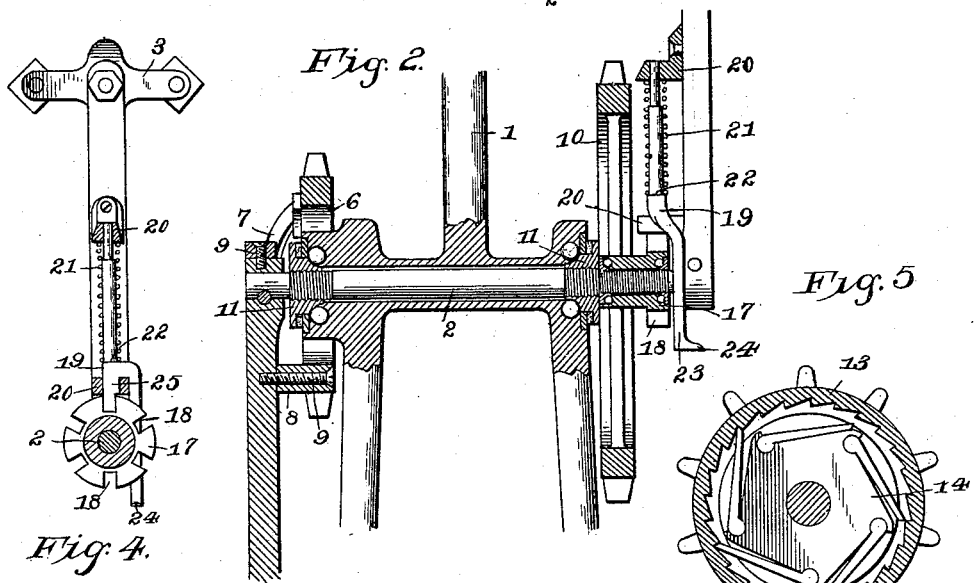
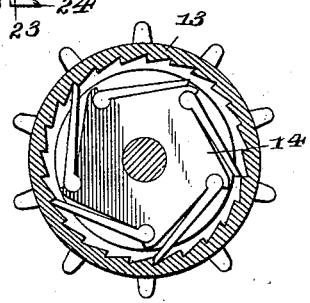
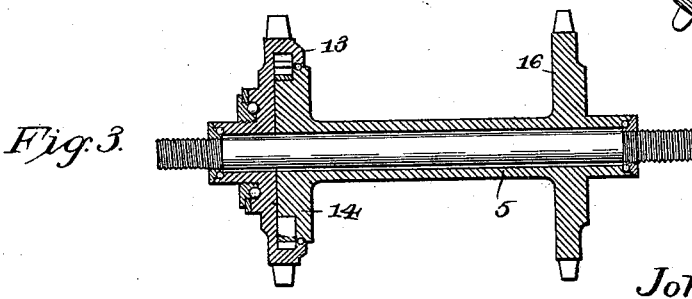
Witnesses
Inventor
John M. Scobee
By his Attorneys.
THE NORRIS PETERS CO., PHOTO-LITHO., WASHINGTON, D. C.

UNITED STATES PATENT OFFICE.

JOHN MORGAN SCOBEE, OF SHELBYVILLE, KENTUCKY.

VARIABLE-SPEED GEARING FOR BICYCLES.

SPECIFICATION forming part of Letters Patent No. 538,287, dated April 30, 1895.

Application filed April 30, 1894. Serial No. 509,564. (No model.)

*To all whom it may concern:*

Be it known that I, JOHN MORGAN SCOBEE, a citizen of the United States, residing at Shelbyville, in the county of Shelby and State of Kentucky, have invented a new and useful Multiple Gearing, of which the following is a specification.

My invention relates to multiple gearing for bicycles, tricycles, and similar vehicles, and has for its object to provide a simple, direct, and efficient gearing capable of being adjusted for power or speed; and to provide simple means for manipulating the adjusting devices, the latter being so constructed as to prevent both the speed and power gearing from being in operation simultaneously.

Further objects and advantages of the invention will appear in the following description, and the novel features thereof will be particularly pointed out in the claims.

In the drawings, Figure 1 is a side view of a bicycle provided with a multiple gearing embodying my invention. Fig. 2 is a transverse section on the line 2 2 of Fig. 1. Fig. 3 is a similar view, on the line 3 3 of Fig. 1. Fig. 4 is a sectional view on the line 4 4 of Fig. 2, to show the means for shifting from power to speed, and vice versa. Fig. 5 is a detail view of the clutch.

Similar numerals of reference indicate corresponding parts in all the figures of the drawings.

1 designates the frame of a bicycle to which the improved gearing is applied; 2, the crank shaft; 3, the cranks; 4, the driving-wheel, and 5 the driving-wheel shaft. The power-gear or sprocket 6 is fixed to the crank shaft preferably by securing the same by intermediate brackets 7 and 8 to the adjacent crank, said brackets being connected by means of bolts 9 to the crank and being integral with the gear, and the speed-gear or sprocket 10 is loosely mounted upon the crank shaft, adjacent to the other crank, and preferably between said crank and a contiguous fixed collar 11. The power-gear is connected by means of a chain 12 with a chain-wheel 13 which is loosely mounted upon the driving-wheel axle and is connected to the latter by means of a clutch 14, whereby when the mechanism is adjusted for operation by the power-gear the forward rotation of the chain-wheel 13 is communicated directly to the shaft of the driving-wheel. The speed-gear is connected by means of a chain 15 with a chain-wheel 16 which is fixed to the driving-wheel shaft, at the opposite end of said shaft from the wheel 13.

The speed-gear carries a notched collar 17, having the peripheral notches 18 which are adapted to be engaged, to lock the speed-gear to the crank-shaft, by means of a locking-bolt 19 which is carried by the adjacent crank. This locking-bolt is mounted slidably in registering guides 20 on said crank, and is actuated, to normally engage the notches of the collar, by a spring 21 which is coiled thereon between the outer guide and a shoulder 22 of the bolt. The bolt is provided with a trip-arm 23 which lies parallel with the crank and extends beyond the inner end thereof, where it is enlarged to form a tread 24, and the shank of the bolt is provided with an offset 25 which is adapted to be engaged with the inner guide when the bolt is depressed, against the tendency of its actuating spring, by pressure upon the free end of the trip-arm, to hold the inner end of the bolt out of engagement with the notches in the locking collar.

The operation of the mechanism is as follows: When the speed-gear is disengaged from the crank-shaft, by the disengagement of the locking-bolt from the notched collar, the rotation of the crank-shaft is communicated through the power-gear, chain, loose chain-wheel, and clutch to the driving-shaft, and when it is desired to change to the speed gearing, the free end of the trip-arm is touched by the foot of the rider, thus disengaging the offset 25 from the guide and allowing the locking-bolt to engage the nearest notch of the locking-collar. The diameter of the speed-gear being greater than that of the power-gear it is obvious that the driving-shaft will be rotated at an increased speed, and therefore that the clutch by which the chain-wheel 13 is connected to the driving-shaft will allow said shaft to turn at a greater speed than the chain-wheel. The adjustment of the trip-arm to change from speed to power gear, and vice versa, is accomplished by a touch of the foot of the rider, without dismounting or altering the prevailing speed of the machine.

Both speed and power gears cannot be in operation at the same time, to cause interference and straining of the parts for the reason that the chains whereby the rotation of the crank shaft is communicated to the driving-shaft are permanently in position for operation, and when the locking-bolt is in engagement with the notches of the locking collar the increased speed of the driving-shaft trips the clutch which forms the connection between the loose-chain-wheel and said shaft, and when the locking-bolt is disengaged from the locking-collar the power gear immediately resumes its function of communicating motion to the driving-wheel. The power-gear cannot have any effect upon the motion of the machine as long as the speed-gear is locked to the pedal shaft.

Various changes in the form, proportion, and minor details of construction may be resorted to without departing from the spirit or sacrificing any of the advantages of the invention.

Having thus described my invention, I claim—

1. The combination with a driving-shaft and a crank-shaft, of a loose chain wheel and a fixed chain wheel on the driving shaft, a clutch connection between the loose chain wheel and the shaft whereby the shaft may be rotated forwardly independent of said loose chain wheel, a power gear fixed to the crank shaft and connected by a chain with the loose wheel on the driving shaft, a speed gear loosely mounted upon the crank-shaft and connected by a chain with the fixed chain wheel on the driving-shaft, and an exteriorly arranged locking bolt for securing the speed gear to the crank-shaft, said bolt being carried by a crank-arm on said shaft and having a trip-arm terminating adjacent to the inner end of the crank-arm and adapted to be pressed by the foot of the rider, substantially as specified.

2. The combination with a crank-shaft, of a fixed power-gear, a loose speed-gear provided with a notched collar, a locking-bolt slidably mounted in guides upon the adjacent crank and adapted to engage the notches in said collar, said bolt being provided with an offset to engage one of the guides when retracted, an actuating spring, a trip-arm having a tread arranged adjacent to the inner end of the crank, and connections between said gears and a driving-shaft, substantially as specified.

In testimony that I claim the foregoing as my own I have hereto affixed my signature in the presence of two witnesses.

JOHN MORGAN SCOBEE.

Witnesses:
SIMON COOK,
S. M. LONG.